(12) United States Patent
Dodd et al.

(10) Patent No.: US 7,881,341 B2
(45) Date of Patent: Feb. 1, 2011

(54) RECONFIGURABLE MEDIA CONTROLLER TO ACCOMMODATE MULTIPLE DATA TYPES AND FORMATS

(75) Inventors: Chris Dodd, Portland, OR (US); Dave Dunning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 11/240,760

(22) Filed: Sep. 30, 2005

(65) Prior Publication Data

US 2007/0076757 A1 Apr. 5, 2007

(51) Int. Cl.
*H04J 3/16* (2006.01)
(52) U.S. Cl. ..................................... 370/469
(58) Field of Classification Search ........................ None
See application file for complete search history.

(56) References Cited

U.S. PATENT DOCUMENTS

| | | | |
|---|---|---|---|
| 6,654,383 B2 * | 11/2003 | Haymes et al. ............. | 370/466 |
| 6,879,598 B2 * | 4/2005 | Zancan et al. .............. | 370/463 |
| 7,440,417 B2 * | 10/2008 | Gallo et al. ................ | 370/254 |
| 7,751,440 B2 * | 7/2010 | Johnston .................... | 370/469 |
| 2004/0062267 A1 * | 4/2004 | Minami et al. ............. | 370/463 |
| 2005/0066045 A1 * | 3/2005 | Johnson et al. ............ | 709/230 |
| 2009/0063696 A1 * | 3/2009 | Wang et al. ................. | 709/232 |

* cited by examiner

*Primary Examiner*—Anh-Vu Ly
(74) *Attorney, Agent, or Firm*—Blakely, Sokoloff, Taylor & Zafman LLP

(57) ABSTRACT

A media controller is reconfigurable to handle different formats and types of data. In one embodiment, the invention includes a media access controller coupled to a higher layer to exchange data with the higher layer, a physical layer connector coupled to the media access controller to exchange data with the media access controller and having an external physical interface to exchange data with an external device, and a configuration block to reconfigure the media access controller based on the format of the data of the external device.

17 Claims, 4 Drawing Sheets

RECONFIGURABLE MEDIA CONTROLLER TO ACCOMMODATE MULTIPLE DATA TYPES AND FORMATS

FIELD

The present description relates to the field of data communication interfaces, and in particular to a media access control architecture that may be reconfigured to operate using different data formats and protocols.

RELATED ART

An Enterprise server is used to receive requests from a network interface and then access mass storage devices to respond to the requests. The mass storage may be in many different forms and communicate on many different protocols. Current protocols include SATA (Serial Advanced Technology Attachment), 10Base-FL (Fiber Link), Fiber Channel, Infiniband, SCSI (Small Computer System Interface), and Ethernet among others. In order for a server to be able to access a particular type of storage device, it is normally constructed using a general purpose processor and a I/O (Input/Output) controller specifically designed for the intended protocols.

To use an additional or different protocol, an adapter card, such as a PCI card is normally added to the system bus that is specifically designed for the other or additional protocol. A protocol-specific design limits flexibility for the system. A protocol-specific I/O controller allows the same general purpose processor to be used in different systems but increases the cost of the system. Adding an additional protocol-specific adapter card adds even more cost. For other types of interfaces within a computer system or router architecture, it may not be possible to add an adapter card for a new protocol. In all such designs, each physical interface is able to communicate using only one protocol.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

The fixed gates associated with the Logical Link Control and part of the Media Access Control functions of both storage and network protocols may be executed on one or more multi-threaded, multi-core processors as efficiently, and with greater flexibility, in software as compared to conventional hardware Media Access Control implementations. With a flexible Media Access Control, framing the exchanged data becomes an important function of the Media Access Control. This may be done so that the protocol being framed is determined by loadable firmware or software. As a result, a universal port may be created that is either told what protocol it will be or determines what protocol it should be by analyzing incoming data.

Figure 1:
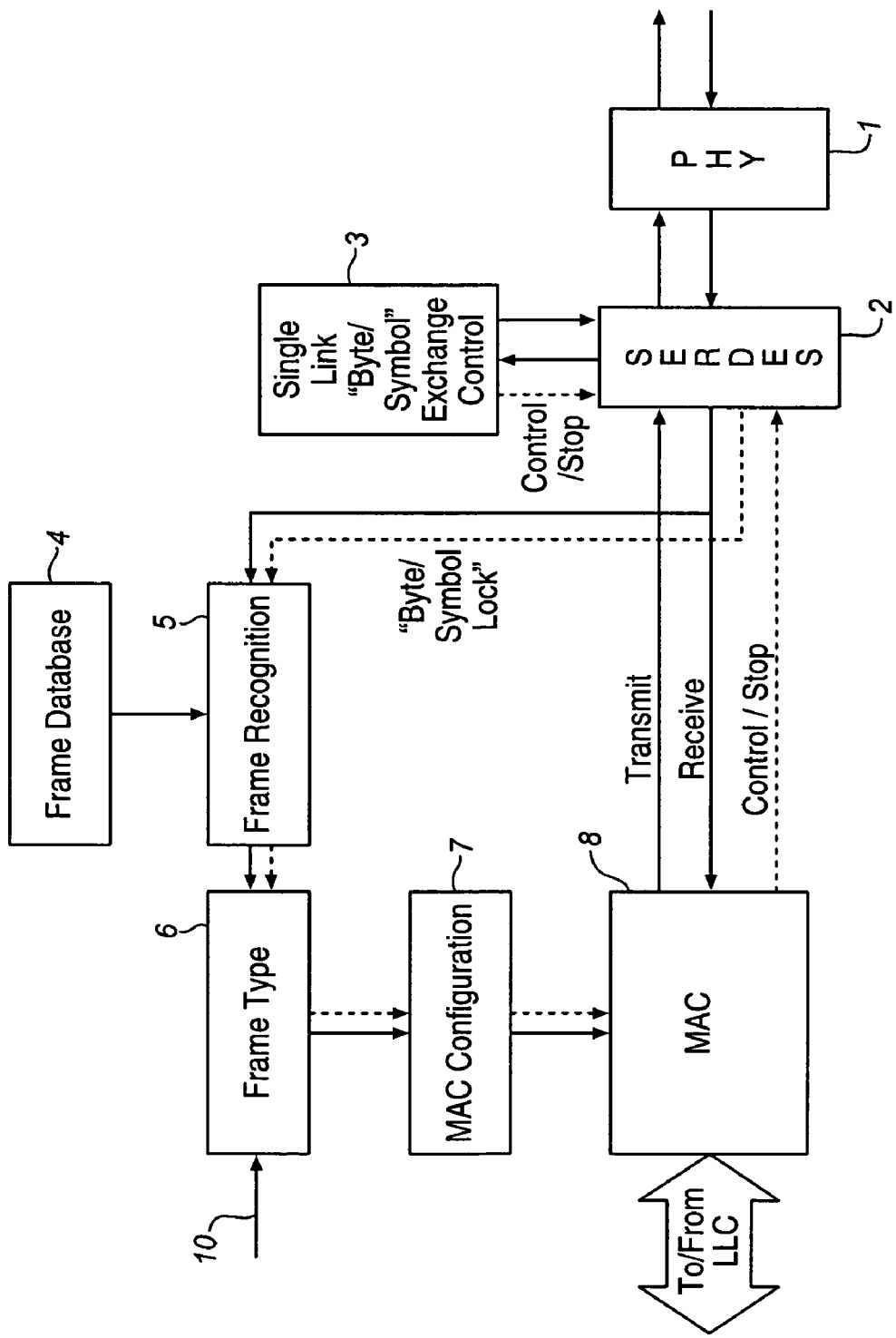
FIG. 1 is a block diagram of a reconfigurable media controller according to an embodiment of the invention.

FIG. 1 shows an example of a protocol-flexible MAC (Media Access Controller) architecture that may be used within a general purpose processor or a flexible I/O controller. This architecture allows the illustrated MAC to be reconfigured for different protocols during startup or runtime. A PHY (physical layer) 1 is coupled to the input and output channels of any of a variety of different types of devices including a mass storage device (not shown). The external device may use any protocol for which the MAC is or may be configured. The data channels may be rendered in any of a variety of different forms including twisted pair wiring, coaxial cable, printed copper traces, stripline or an optical interface. The optical interface may use photodetectors and semiconductor lasers for receiving and sending or any other optical interface. A variety of different optical interface standards may be used including an SFP (Small Form-Factor Pluggable) optical transceiver.

The input and output channels of the PHY are coupled to a SERDES (Serializer/Deserializer) block 2. The SERDES block is coupled to a single link "Byte/Symbol" exchange control box 3 to synchronize with the serial data stream coming in on the input port of the PHY. The SERDES block has an input and an output channel that is coupled to a MAC (Media Access Controller). The MAC then is coupled to a LLC (Logical Link Control) layer that is, in turn, coupled to higher layers. If the MAC is already configured for the type of data or protocol that is coupled to the PHY, then the data may pass directly from the PHY, through the SERDES and the MAC to the LLC.

For purpose of the present description, the functionality of the illustrated architecture is described using terminology that divides a Data Link Layer into Logical Link Control functionality and Media Access Control functionality. Accordingly, the MAC provides fair and deterministic access to the medium, address recognition and generation and verification of frame check sequences. Its primary function is the delivery of frames, including frame insertion repetition and removal. The particular terminology used is provided as an example to aid in understanding. Functions may be moved or redistributed to suit a particular application.

To determine the data format or protocol of the incoming and outgoing data on the PHY, the synchronized content may be forwarded to a frame recognition block 5. The frame recognition block parses the incoming data stream and compares it to frame templates stored in a frame database 4. If a match is found, then the resulting match may be sent to a frame type function block 6.

The frame database stores frame templates. The templates each identify, headers, fields, and tail bits for standardized frame formats. These formats are those set by standards bodies for data communications formats and protocols, such as those mentioned above for SATA, 10Base-FL, Fiber Channel, Infiniband, SCSI, and Ethernet among others. The frame recognition block stores a received frame in a buffer and then fetches a stored template from the frame database. The frame and template are lined up and compared. The comparison may be bit-by-bit or characteristic markers in the frame may be compared. If the frame has traffic fields that are allowed to vary in length, then markers may be used to align the template fields to the fields of the received frame.

A match may be declared if there is an exact match between the received frame and the template. Alternatively, more complex algorithms may be used. For example, a score may be generated that reflects the number of matching values. The different patterns may be weighted to show that a match in a header is more significant than a match in a tail bit.

The frame recognition block cycles through all of the frame templates until a match is found or it tests all the templates and selects the template with the highest score. Each frame template is associated with a particular data format and protocol. The frame recognition block, upon finding a match accesses an identifier for that data format and protocol and sends it to the frame type block.

Based on the recognized type of the frame, the frame type function block 6 accesses a configuration file and sends this to a MAC configuration block 7. The MAC configuration block configures the MAC 8 in accordance with the determined data type and protocol. The MAC may be configured by loading appropriate software or firmware or by activating a particular logic area. Alternatively, configuration registers within the MAC may be set. The system is then properly configured for the device attached to the PHY.

As long as the received frames match up with the templates in the frame database, the data exchange through the MAC may be maintained. If the frames stop corresponding to the expected format, then this may be detected and the frame recognition block 5 may be used to reconfigure the MAC for the new data format and protocol. In one embodiment, the frame recognition block continues to check frames against the stored templates to ensure that the frames continue to match up with the stored template. In another embodiment, the MAC generates an error message when it cannot parse a frame. The frame recognition and matching process may then be initiated to reconfigure the MAC if possible.

In an alternative embodiment, the higher layers may set the data format or protocol for which the MAC is to be configured. The frame type block may have an external control input 10 coupled to the higher layers. This control input may specify a data type or a configuration file. The frame type block may then signal the MAC configuration block 7 to configure the MAC 8 accordingly. In such an embodiment, the frame database, and frame recognition block and the connection from the SERDES may be deleted. If all of these components are maintained, then they may be used to offer both modes of operation in a single device.

The external control input may come from a BIOS (Basic Input/Output System) on startup, from an OS (Operating System) or from a communications application or driver. The input may be based on a hardware detection routine, a user installation process or a manufacturer or installer setting. As a result, the architecture may be used to provide a dedicated system that operates with only one type of device or it may be used to offer plug and play functionality or any level of flexibility in between.

In another embodiment, the logic represented by blocks 4-7 may be repeated for each data format or protocol that is supported. In addition multiple MACs may be used for each protocol. The input data may be compared to frame templates at each instantiation of blocks 4-8 of FIG. 1 and the appropriate set of logic may be activated when a match is found.

Figure 2:
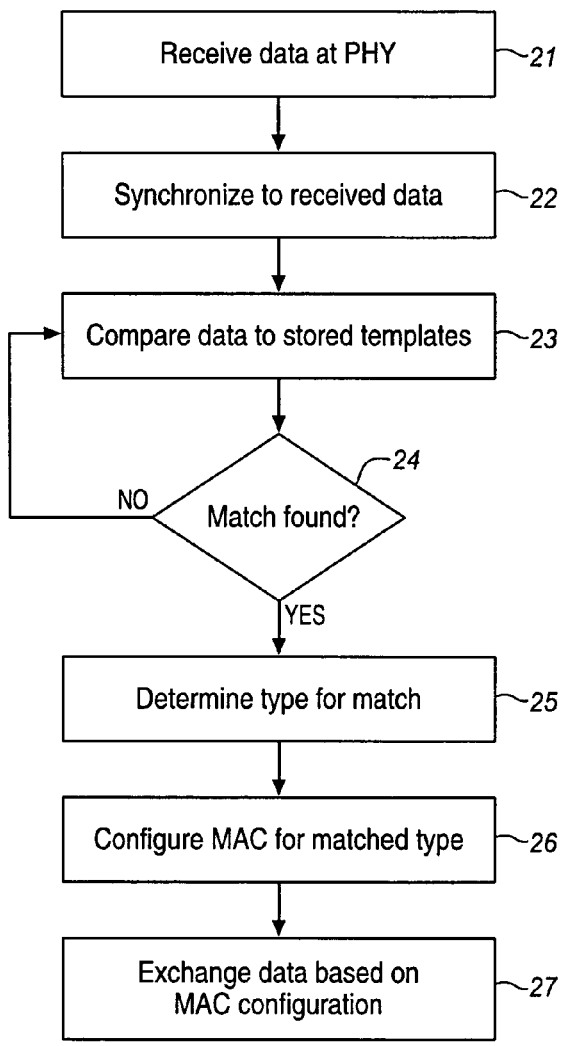
FIG. 2 is a process flow diagram of reconfiguring the media controller according to an embodiment of the invention.

FIG. 2 shows a process that may be used to implement an embodiment of the invention. In FIG. 2, data is received at the PHY at block 21. As mentioned above, this data may be from any other type of device and in one embodiment, is from an external mass storage drive. At block 22 a deserializer synchronizes to the incoming data to render it into a bit stream that may be communicated over the internal data channels of the MAC architecture. At block 23, the received data may be compared to stored templates to determine if there is a match.

In one embodiment, this may be done using one template from one protocol. In another embodiment, it may be done using multiple templates from one protocol. In another embodiment, it may be done using templates from different protocols.

At block 24, if a match is found, then the protocol type for the match is determined at block 25. If a match is not found, then the data may be compared to other templates at block 23. If there are no more templates then the process may stop without the MAC being able to communicate using the intended protocol. At block 26, the match type has been determined, and the MAC is configured for the matched type. With the MAC configured, data may be sent and received through the PHY and the MAC at block 27.

Figure 3:
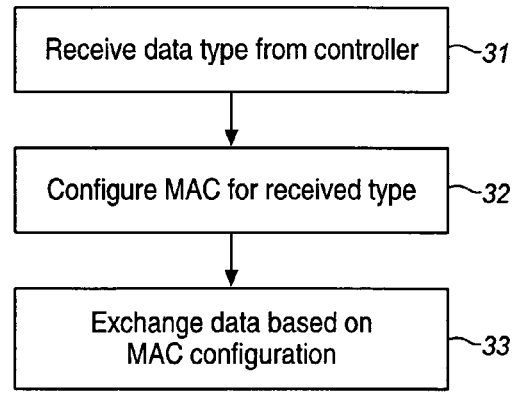
FIG. 3 is a process flow diagram of reconfiguring the media controller according to another embodiment of the invention.

FIG. 3 shows an alternate embodiment, in which the MAC architecture does not determine the data format or protocol. Instead, an instruction is received on the control line, at block 31. At block 32, the MAC is configured for the data type identified by the control line and at block 33, data is sent and received based on the received type. As mentioned above, the control line may operate based on any type of instruction from higher layers or it may be based on fuse bits or register settings. The external control line allows the MAC configuration to be changed by a manufacturer when implementing a system, by a hardware configuration application or utility or by a user based on need.

Figure 4:
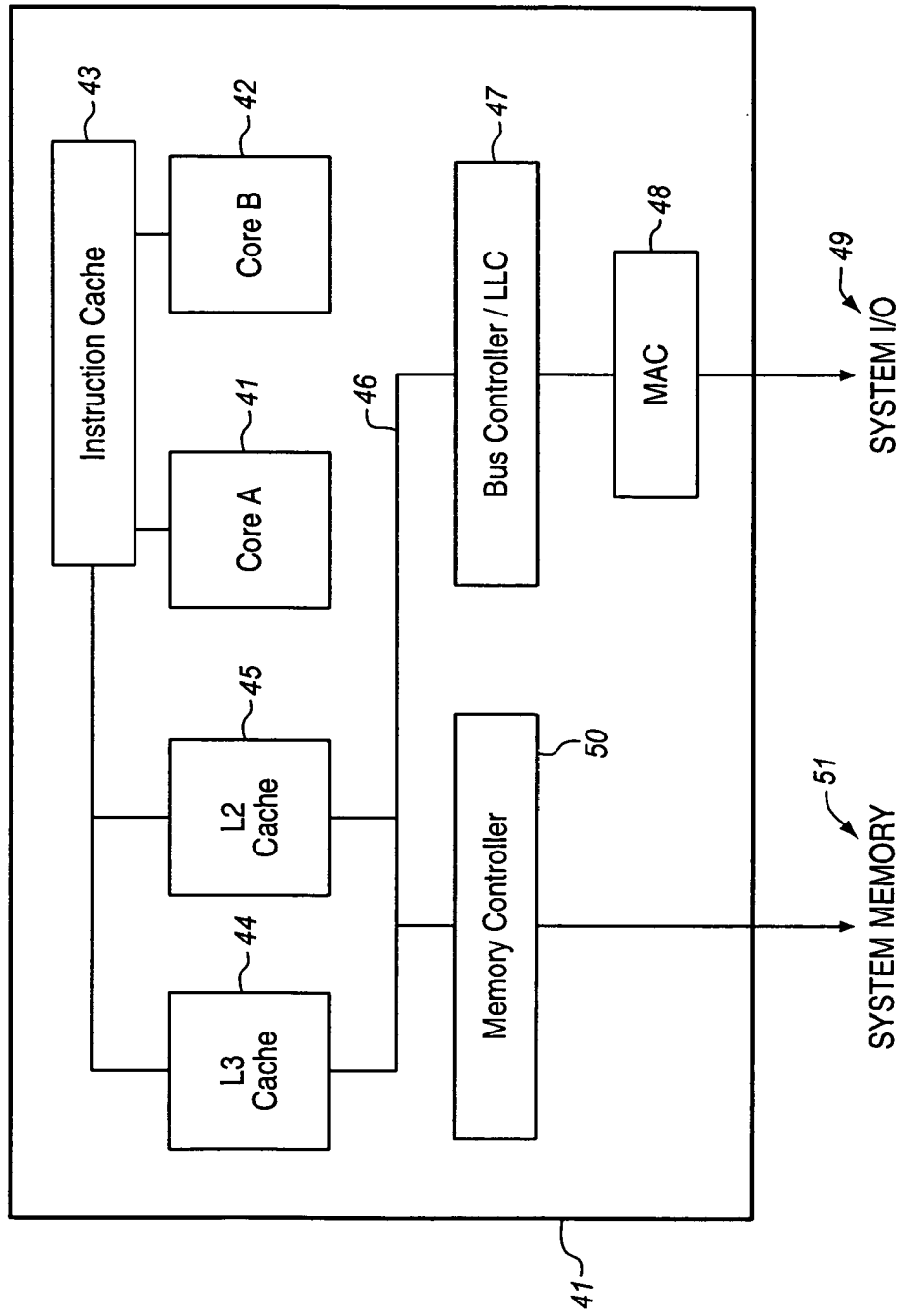
FIG. 4 is a block diagram of a microprocessor environment suitable for implementing an embodiment of the invention.

FIG. 4 shows a simplified block diagram of an example of multi-core processor incorporating the MAC architecture of FIG. 1. In FIG. 4, first and second processor cores 41, 42 are coupled to an instruction cache and fetch engine. The instruction cache and fetch engine is coupled to L2 45 and L3 44 cache memories to retrieve instructions and data. The caches are coupled through a system bus 46 to a memory controller 50 and a bus controller/LLC 47. The bus controller is also coupled to a MAC architecture 48 such as that shown above in FIG. 1 and through the MAC architecture to system input and output devices 48. The MAC architecture may operate under the control of the bus controller or routines operated in the processor core. Similarly, the memory controller is coupled to system memory 51 to obtain instructions and data.

The architecture of FIG. 4 is provided only as an example, a variety of variations are possible. For example, the processor 41 may have one core or many cores. The MAC may be shared with the memory system interface or two MACs may be used one for the I/O interface and one for the system interface. Alternatively, there may be a single I/O interface that is shared between peripheral devices and memory. As a further alternative, the system bus may be coupled to one or more hubs, such as a north bridge hub for memory access and a south bridge for access to mass storage and other I/O devices. The MAC architecture of FIG. 1 may, in such a case, be deployed at the interface of the microprocessor as well as in the hubs at the interface between the north bridge and south bridge and between the north bridge and the microprocessor. The north bridge and south bridge may also be combined into a single component separate from, or as shown in FIG. 1, integrated into the processor.

Figure 5:
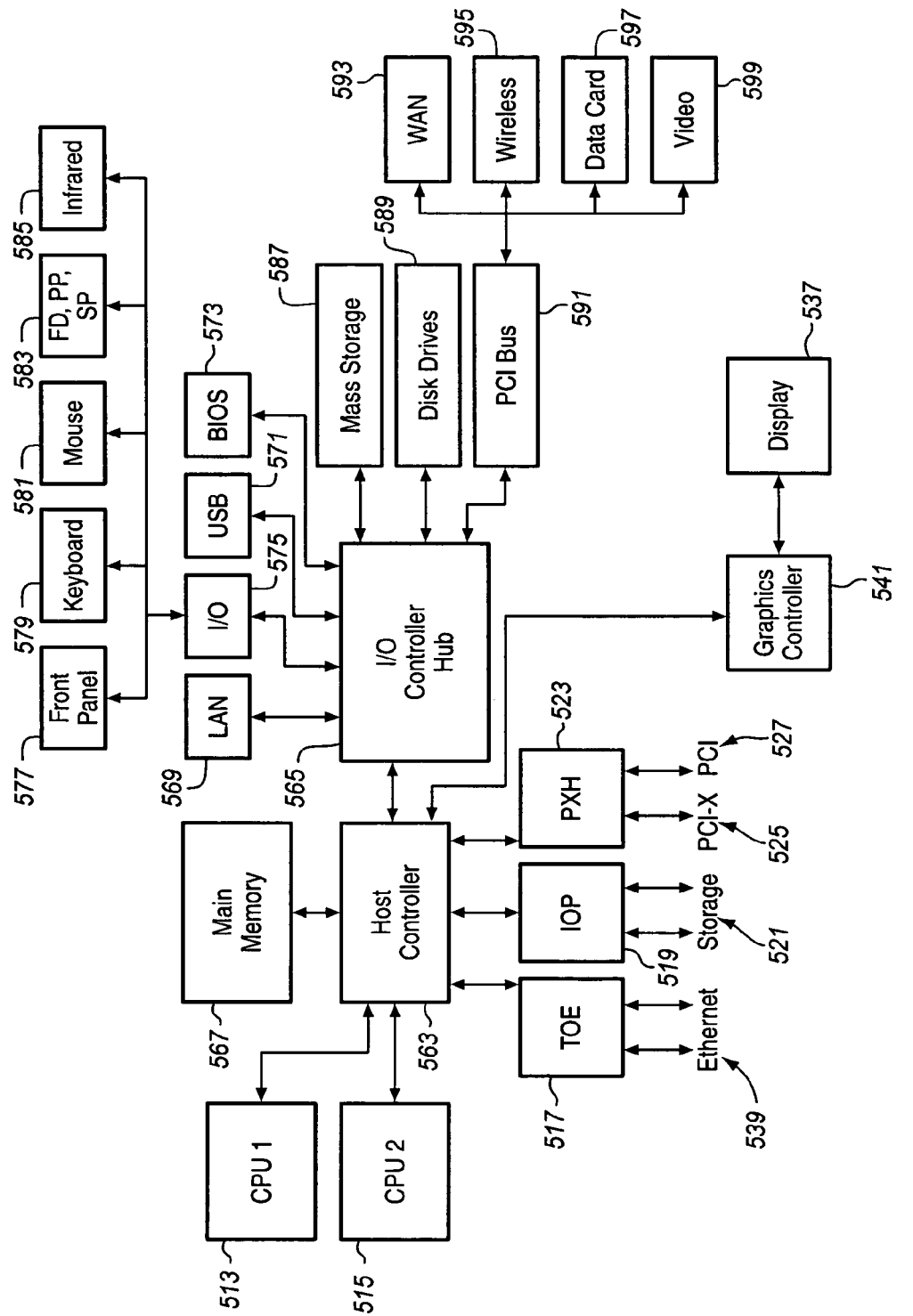
FIG. 5 is an example of a computer system suitable for incorporating embodiments of the present invention.

FIG. 5 shows an example of an enterprise server to which embodiments of the present invention may be applied. A north bridge, or host controller 563 interfaces one or more CPUs (central processing unit) with memory and I/O devices and may provide a wide range of features such as serviceability, system management and hot plug exchange of CPUs. It may include I/O clusters, a memory controller, snoop filters, and a wide range of logic for handling transactions. The north bridge is coupled to a south bridge or ICH (Input/Ouput Controller Hub) 565. While the example of FIG. 5, includes microprocessors coupled to a MCH and an ICH, either the MCH or the ICH or both or any of the functions of these chips may be incorporated into the microprocessor. The MCH and the ICH may also be combined, in whole or in part, inside of or outside of the microprocessor.

In the example of FIG. 5, the MCH 563 has a pair of FSBs (front side bus) each coupled to a CPU or processor core 513, 515. More or less than two processor cores and FSBs may be used. Any number of different CPUs and chipsets may be used. The MCH receives and fulfills read, write and fetch instructions from the processor cores over the FSBs. The MCH also has an interface to system memory 567, such as DIMMs (Dual In-line Memory Modules) in which instructions and data may be stored, and an interface to the ICH (input/output controller hub) 565.

The MCH also has an interface, such as a PCI (peripheral component interconnect) Express, or AGP (accelerated graphics port) interface to couple with a graphics controller 541 which, in turn, provides graphics and possible audio to a display 537. The PCI Express interface may also be used to couple to other high speed devices. In the example of FIG. 5, six×4 PCI Express lanes are shown. Two lanes connect to a TCP/IP (Transmission Control Protocol/Internet Protocol) Offload Engine 517 which may connect to network or to TCP/IP devices such as Gigabit Ethernet controllers 539. Two lanes connect to an I/O Processor node 519 which can support storage devices 521 using SCSI (Small Computer System Interface), RAID. (Redundant Array of Independent Disks) or other interfaces. Two more lanes connect to a PCI translator hub 523 which may support interfaces to connect PCI-X 525 and PCI 527 devices. The PCI Express interface may support more or fewer devices than are shown here. In addition, while PCI Express and AGP are described, the MCH may be adapted to support other protocols and interfaces instead of, or in addition to those described.

The ICH 565 offers possible connectivity to a wide range of different devices. Well-established conventions and protocols may be used for these connections. The connections may include a LAN (Local Area Network) port 569, a USB hub 571, and a local BIOS (Basic Input/Output System) flash memory 573. A SIO (Super Input/Output) port 575 may provide connectivity for a front panel 577 with buttons and a display, a keyboard 579, a mouse 581, and infrared devices 585, such as IR blasters or remote control sensors. The I/O port may also support floppy disk, parallel port, and serial port connections 583. Alternatively, any one or more of these devices may be supported from a USB, PCI or any other type of bus or interconnect.

The ICH may also provide an Infiniband, Fiber Channel, iSCSI, IDE (Integrated Device Electronics) bus or SATA (serial advanced technology attachment) bus for connections to disk drives 587, 589 or other large memory devices. The mass storage may include hard disk drives and optical drives. So, for example, software programs, parameters or user data, may be stored on a hard disk drive or other drive. A PCI (Peripheral Component Interconnect) bus 591 is coupled to the ICH and allows a wide range of devices and ports to be coupled to the ICH. The examples in FIG. 5 include a WAN (Wide Area Network) port 593, a Wireless port 595, a data card connector 597, and a video adapter card 599. There are many more devices available for connection to a PCI port and many more possible functions. The PCI devices may allow for connections to local equipment, or nearby computers. They may also allow for connection to various peripherals, such as printers, scanners, recorders, displays and more. They may also allow for wired or wireless connections to more remote equipment or any of a number of different interfaces.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller.

The MAC architecture of FIG. 1 may be provided for any of the interfaces of FIG. 5 for which flexibility may be desired. The MAC architecture may be applied to the mass storage 587 interface of the south bridge 565 to allow different types of mass storage devices to be connected. It may also be applied to the interfaces of the north bridge 563 to allow different PCI or other devices to be attached. Even the Super I/O interface 575 may benefit from a flexible MAC layer as described above. In addition, as mentioned above, the north bridge and the south bridge may be incorporated into one or more of the processor cores 513, 515 and the flexible MAC architecture of FIG. 1 may be incorporated into the processor core to allow for flexible I/O directly within the processor.

A lesser or more equipped MAC architecture, PHY, frame recognition system, microelectronic chip, and computer environment than the examples described above may be preferred for certain implementations. Therefore, the configuration of these elements and environments will vary from implementation to implementation depending upon numerous factors, such as price constraints, performance requirements, technological improvements, or other circumstances. Embodiments of the invention may also be applied to other types of systems that use different hardware architectures than that shown in the Figures.

While embodiments of the invention have been described in the context of a south bridge coupled to mass memory devices, embodiments of the invention may also be applied to a wide range of other devices. Embodiments of the invention may be applied to any device that transfers data between other devices based on pre-established timing, data formats and protocols from the other devices. Embodiments of the invention may also be applied to a wide variety of chips that may benefit from flexible connectivity including PCI adapter cards, network interface cards, routers, networked memory devices, and personal computers.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a media center (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

The invention claimed is:

1. An integrated circuit comprising:
a reconfigurable media controller;
a physical layer connector having an external physical interface to exchange data with an external device;
a deserializer to receive a data stream from the physical layer connector, to synchronize to the data stream and to provide the data stream to the media controller;
a frame recognition block coupled to the deserializer to receive the data stream received from the external device and coupled to determine a format of the data stream received from the external device prior to the media controller parsing the data stream;
a configuration block coupled to load an appropriate configuration into the media controller to reconfigure software of the media controller so that the media controller can parse the data stream based on the format of the data stream determined by the frame recognition block; and
a link layer controller coupled to the media controller and to a higher layer of the integrated circuit to exchange data between the media controller and the higher layer.

2. The integrated circuit of claim 1, wherein the frame recognition block includes a frame database of templates to compare with data received from the external device and wherein the templates in the frame database each identify headers and fields for standardized frame formats.

3. The integrated circuit of claim 1, further comprising an external control input coupled to the configuration block to receive an external control signal to indicate a data format for received data, and wherein the configuration block reconfigures the media controller based on the indicated data format.

4. The integrated circuit of claim 3, wherein the external control signal is generated during a start up routine.

5. The integrated circuit of claim 1, wherein the configuration block loads an appropriate configuration by loading software into the media controller.

6. A computer system comprising:
a peripheral bus to communicate data with a peripheral device;
a system memory to temporarily store data from the peripheral device; and
a processor to fetch data from the peripheral device and from the system memory, the processor having a physical interface with the peripheral bus including a deserializer to receive a data stream from the physical interface, to synchronize to it and provide the data to a media controller, the media controller coupled to the deserializer, a frame recognition block coupled to the deserializer to determine a format of the data stream received from the peripheral device prior to the media controller parsing the data stream, a configuration block to load an appropriate software configuration into the media controller so that the media controller can parse the data stream based on the format as determined by the frame recognition block, and a link layer controller coupled to the media controller and to a higher layer of the processor to exchange data between the media controller and the higher layer.

7. The system of claim 6, wherein the processor includes frame database of templates for comparison to the received data and wherein the templates in the frame database each identify headers and fields for standardized frame formats.

8. The system of claim 7, wherein the processor has a core and wherein the configuration block is coupled to the processor core to receive an indication of the data format of the peripheral device to reconfigure the media controller.

9. A method comprising:
receiving data at a physical layer connector of an integrated circuit from an external device, the received data being formatted as data frames;
receiving the data frames at a deserializer to synchronize to it and provide the data to a media controller of the integrated circuit coupled to the deserializer;
determining a format for the data frames by a frame recognition block prior to the media controller parsing the data frames;
loading by a configuration block a software configuration into the media controller based on the format as determined by the frame recognition block;
parsing and verifying the data frames in the media controller; and
exchanging data between the media controller and higher layers of the integrated circuit through a link layer controller.

10. The method of claim 9, further comprising comparing additional data received from the external device to a template in a frame database for the determined data format and reconfiguring the media controller if the received data does not match the template.

11. The method of claim 9, further comprising receiving a signal from an installation utility to indicate a data frame format of the received data.

12. The method of claim 9, further comprising comparing the received data frames to frame templates each corresponding to a particular data format having headers and fields for standardized frame formats.

13. The method of claim 12, further comprising comparing the data frames to a plurality of stored templates by lining up a given data frame and a given template and comparing the data frames bit by bit, the stored templates corresponding to different data formats.

14. The method of claim 9, wherein loading the software configuration into the media controller comprises loading firmware into the media controller.

15. An apparatus including a tangible computer readable semiconductor memory storage medium encoded with computer executable instructions which when executed by a central processing unit (CPU) cause the CPU to perform operations comprising:
receiving data at a physical layer connector of an integrated circuit from an external device, the received data being formatted as data frames;
receiving the data frames at a deserializer to synchronize to it and to provide the data frames to a media controller of the integrated circuit coupled to the deserializer;
determining a format for the data frames prior to the media controller parsing the data frames;

loading by a configuration block a software configuration into the media controller based on the format as previously determined;

parsing and verifying the data frames in the media controller; and exchanging data between the media controller and higher layers of the integrated circuit through a link layer controller.

16. The apparatus of claim 15, further comprising loading firmware for the media controller from a startup utility.

17. The apparatus of claim 15, wherein determining a format comprises comparing the received data frames to stored templates, the stored templates corresponding to different data formats and each identifying headers and fields for standardized frame formats.

* * * * *